(12) United States Patent
Kim et al.

(10) Patent No.: US 10,286,902 B2
(45) Date of Patent: May 14, 2019

(54) DRIVING ASSISTANCE DEVICE AND DRIVING ASSISTANCE METHOD USING THE SAME

(71) Applicant: MANDO CORPORATION, Pyeongtaek-si, Gyeonggi-do (KR)

(72) Inventors: Jae Suk Kim, Yongin-si (KR); Kwan Sun You, Yongin-si (KR)

(73) Assignee: MANDO CORPORATION, Pyeontaek-si, Gyeonggi-do (KR)

(*) Notice: Subject to any disclaimer, the term of this patent is extended or adjusted under 35 U.S.C. 154(b) by 49 days.

(21) Appl. No.: 15/482,227

(22) Filed: Apr. 7, 2017

(65) Prior Publication Data
US 2017/0291601 A1  Oct. 12, 2017

(30) Foreign Application Priority Data

Apr. 8, 2016  (KR) .......................... 10-2016-0043408

(51) Int. Cl.
| | |
|---|---|
| *B60W 30/06* | (2006.01) |
| *B60W 10/04* | (2006.01) |
| *B60W 10/18* | (2012.01) |
| *B60W 10/20* | (2006.01) |
| *B60W 10/06* | (2006.01) |

(52) U.S. Cl.
CPC ............ *B60W 30/06* (2013.01); *B60W 10/04* (2013.01); *B60W 10/06* (2013.01); *B60W 10/18* (2013.01); *B60W 10/20* (2013.01); *B60W 2510/182* (2013.01); *B60W 2510/20* (2013.01); *B60W 2520/28* (2013.01); *B60W 2550/142* (2013.01); *B60W 2710/0666* (2013.01); *B60W 2710/182* (2013.01); *B60W 2710/20* (2013.01); *B60W 2720/28* (2013.01)

(58) Field of Classification Search
CPC ...... B60W 10/04; B60W 30/06; B60W 10/20; B60W 10/18; B60W 10/06; B60W 2710/20; B60W 2710/182; B60W 2550/142; B60W 2520/28
See application file for complete search history.

(56) References Cited

U.S. PATENT DOCUMENTS

| | | | |
|---|---|---|---|
| 9,630,623 B2* | 4/2017 | Fairgrieve | ............... B60L 3/106 |
| 2005/0278107 A1* | 12/2005 | Disser | ................... B60T 8/1755 |
| | | | 701/76 |
| 2008/0071459 A1* | 3/2008 | Sokoll | ..................... B60T 7/122 |
| | | | 701/81 |

(Continued)

FOREIGN PATENT DOCUMENTS

| | | |
|---|---|---|
| DE | 102007002267 A1 | 8/2008 |
| DE | 102015006915 A1 | 12/2015 |
| KR | 10-2012-0040789 A | 4/2012 |

OTHER PUBLICATIONS

German Office Action dated Aug. 23, 2017 issued in German Patent Application No. 102017003381.1.

*Primary Examiner* — Mussa A Shaawat
(74) *Attorney, Agent, or Firm* — Mando Corporation

(57) ABSTRACT

Provided are a driving assistance device and a driving assistance method using the same, which are capable of guiding safe parking-in or parking-out by increasing engine torque and applying the increased engine torque to an engine control unit when there is no movement of a vehicle during automatic parking-in control or automatic parking-out control of the vehicle at preset engine torque and brake pressure.

8 Claims, 2 Drawing Sheets

(56) References Cited

U.S. PATENT DOCUMENTS

| | | | | |
|---|---|---|---|---|
| 2008/0195289 | A1* | 8/2008 | Sokoll | B60T 7/122 |
| | | | | 701/70 |
| 2009/0093337 | A1* | 4/2009 | Soliman | B60K 6/442 |
| | | | | 477/5 |
| 2010/0235064 | A1* | 9/2010 | Mallet | B60T 7/122 |
| | | | | 701/70 |
| 2015/0203117 | A1* | 7/2015 | Kelly | B60K 31/02 |
| | | | | 701/91 |
| 2015/0232092 | A1* | 8/2015 | Fairgrieve | B60W 30/143 |
| | | | | 701/93 |
| 2017/0247023 | A1* | 8/2017 | Owen | B60T 8/1766 |
| 2017/0274877 | A1* | 9/2017 | Wou | B60T 8/171 |

* cited by examiner

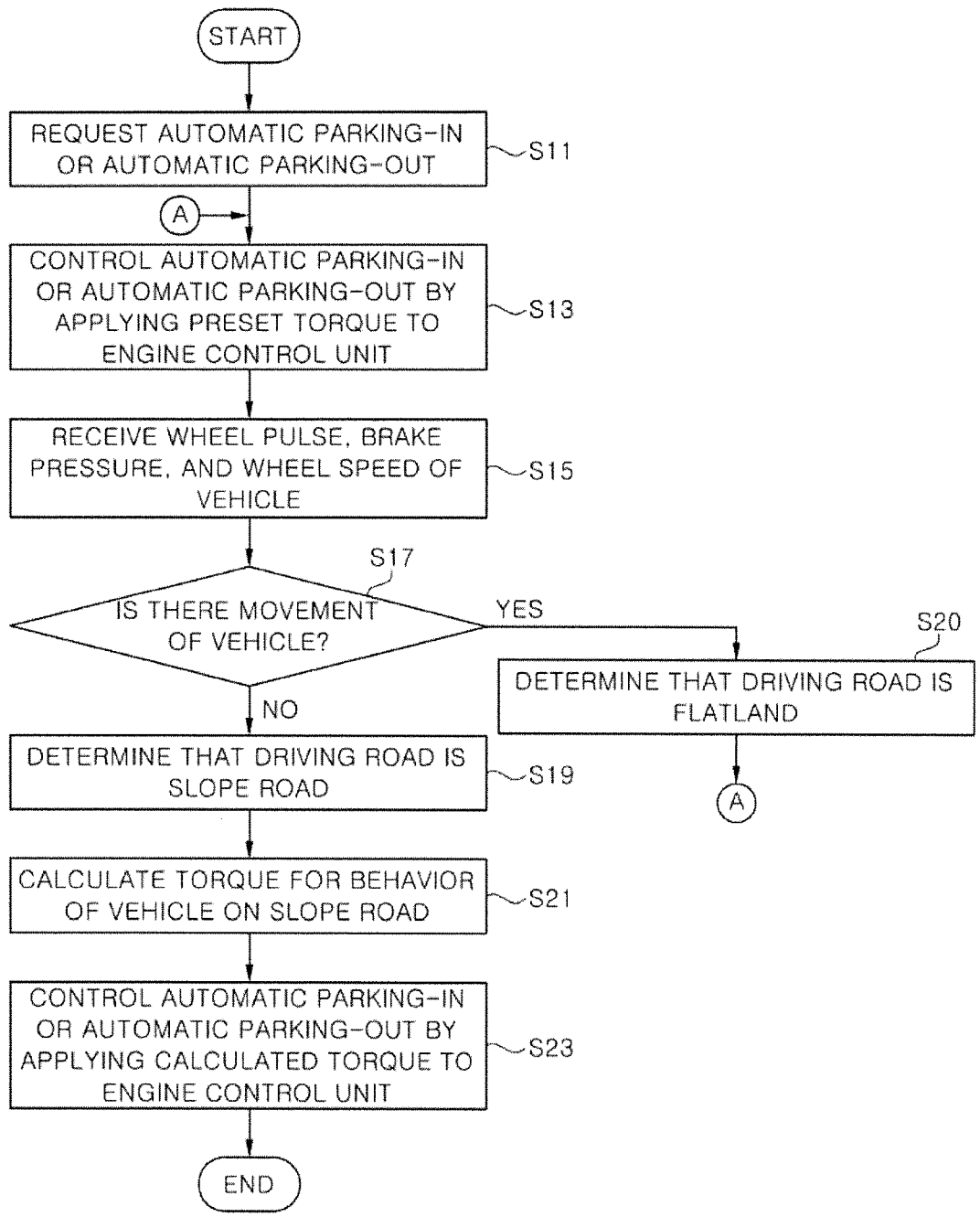

DRIVING ASSISTANCE DEVICE AND DRIVING ASSISTANCE METHOD USING THE SAME

CROSS-REFERENCE(S) TO RELATED APPLICATION

This application claims the benefit of Korean Patent Application No. 10-2016-0043408, filed on Apr. 8, 2016, in the Korean Intellectual Property Office, the disclosure of which is incorporated herein in its entirety by reference.

BACKGROUND OF THE INVENTION

Field of the Invention

The present invention relates to a driving assistance device and a driving assistance method using the same, and more particularly, to a driving assistance device and a driving assistance method using the same, which are capable of guiding safe parking-in or parking-out by increasing engine torque and applying the increased engine torque to an engine control unit when there is no movement of a vehicle during automatic parking-in control or automatic parking-out control of the vehicle at preset engine torque and brake pressure.

Description of the Related Art

Recently, an automatic parking control technology for assisting parking has been developed. Such an automatic parking control technology is a technology for searching around a space for parking of a vehicle, such that the vehicle is parked in the space, calculating a parking route according to the found result, and performing steering control according to the parking route to assist the parking of the vehicle.

Parking assistance devices for assisting parking of a vehicle are disclosed in many patent applications (for example, Korean Patent Application Publication No. 2012-0040789).

The existing parking assistance device disclosed in, for example, Korean Patent Application Publication No. 2012-0040789, includes an automatic steering control unit configured to perform automatic steering control for automatic parking of a vehicle; a parking situation checking unit configured to check whether a parking situation is a front warning situation, a rear warning situation, or a front and rear warning situation, based on a front distance to a front obstacle and a rear distance to a rear obstacle, during automatic steering control; and a warning situation control unit configured to output a reverse-move message or a forward-move message for guiding the turning of the vehicle when the parking situation is the front warning situation or the rear warning situation and to output a stop message for guiding the stopping of the vehicle when the parking situation is the front and rear warning situation.

Such a parking assistance device searches for a parking space, sets a parking reference line, and performs parking control such that the vehicle does not deviate from an allowable error preset with reference to the set parking reference line.

However, in the existing parking assistance device, since only engine torque suitable for a flatland is applied to an engine even when parking the vehicle on the slope road, a behavior of the vehicle according to a slope does not occur. Thus, there has occurred a situation in which the parking of the vehicle was impossible, and it has been feared that a vehicle collision would occur due to occurrence of vehicle sliding in parking the vehicle on the slope road.

In addition, since the existing parking assistance device determines an inclination of the vehicle based on a measurement value measured through a longitudinal G sensor having high signal sensitivity at a low speed, an excessive signal error has occurred according to the sensitivity of the longitudinal G sensor.

PRIOR ART DOCUMENT

Patent Document (Patent Document 1) Korean Patent Application Publication No. 2012-0040789 (published on Apr. 30, 2012), entitled "PARKING ASSISTANCE METHOD AND SYSTEM THEREFOR"

SUMMARY OF THE INVENTION

An aspect of the present invention is directed to provide a driving assistance device and a driving assistance method using the same, which are capable of guiding safe parking-in or parking-out by increasing engine torque and applying the increased engine torque to an engine control unit when there is no movement of a vehicle during automatic parking-in control or automatic parking-out control of the vehicle at preset engine torque and brake pressure.

According to an embodiment of the present invention, a driving assistance device for assisting parking-in or parking-out of a vehicle includes: an electronic control unit configured to determine whether a driving road of the vehicle is a slope road, based on a a wheel pulse, a brake pressure, and a wheel speed of the vehicle, during parking-in control or parking-out control of the vehicle, and to increase torque to be applied to the engine control unit when the driving road of the vehicle is the slope road.

The electronic control unit may determine that the driving road is the slope road, when the wheel speed is zero although the wheel pulse is received and the brake pressure is less than or equal to the preset brake pressure during the automatic parking-in control or the automatic parking-out control of the vehicle by applying the preset torque to the engine control unit while reducing the brake pressure to a preset brake pressure.

The electronic control unit may enable a movement of the vehicle on the slope road by applying a value of gain×(the preset torque) to the engine control unit of the vehicle that is determined as traveling on the slope road, where the gain is a predetermined set value influencing the torque.

The electronic control unit may continuously control a behavior of the vehicle on the slope road by measuring a wheel travel of the vehicle and applying torque based on (wheel travel/wheel tooth) to the engine control unit, where the wheel travel is an actual travel distance calculated through a wheel pulse of the vehicle and the wheel tooth is a travel distance preset according to a degree of slope.

According to another embodiment of the present invention, a driving assistance method using a driving assistance device for assisting parking-in or parking-out of a vehicle includes: receiving a wheel pulse, a brake pressure, and a wheel speed of the vehicle during parking-in control or parking-out control of the vehicle; determining whether a driving road of the vehicle is a slope road, based on the received wheel pulse, the received brake pressure, and the received wheel speed; and performing the parking-in control or the parking-out control of the vehicle by increasing torque applied to an engine control unit when the driving road of the vehicle is the slope road.

The determining of whether the driving road of the vehicle is the slope road may include determining that the driving road is the slope road, when the wheel speed is zero although the wheel pulse is received and the brake pressure is less than or equal to the preset brake pressure during the automatic parking-in control or the automatic parking-out control of the vehicle by applying the preset torque to the engine control unit while reducing the brake pressure to a preset brake pressure.

The performing of the parking-in control or the parking-out control of the vehicle may include applying a value of gain×(the preset torque) to the engine control unit, where the gain is a predetermined set value influencing the torque.

The performing of the parking-in control or the parking-out control of the vehicle may include measuring a wheel travel of the vehicle and applying torque based on (wheel travel/wheel tooth) to the engine control unit of the vehicle, where the wheel travel is an actual travel distance calculated through the wheel pulse of the vehicle and the wheel tooth is a travel distance preset according to a degree of slope.

BRIEF DESCRIPTION OF THE DRAWINGS

FIG. 2 is a flowchart of a driving assistance method using a driving assistance device, according to another embodiment of the present invention.

DETAILED DESCRIPTION OF EMBODIMENTS

Figure 1:
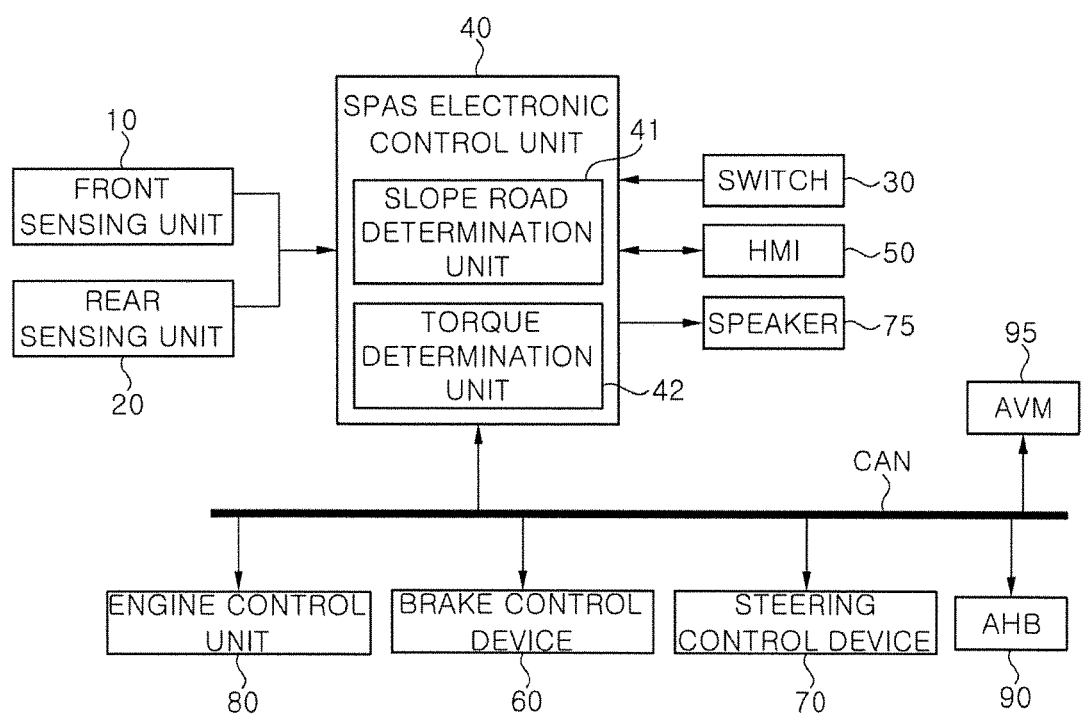
FIG. 1 is a block diagram of a driving assistance device according to an embodiment of the present invention.

Hereinafter, preferred embodiments of the present invention will be described in detail with reference to the accompanying drawings.

FIG. 1 is a block diagram of a driving assistance device according to an embodiment of the present invention.

Referring to FIG. 1, the driving assistance device according to the embodiment of the present invention is a device that assists parking-in or parking-out of a vehicle. The driving assistance device includes a front sensing unit 10 installed on a front side of a vehicle, a rear sensing unit 20 installed on a rear side of the vehicle, a smart parking assistance system (SPAS) electronic control unit 40 (hereinafter, simply referred to as an "electronic control unit") connected to the front sensing unit 10 and the rear sensing unit 20, a switch 30 configured to select automatic parking-in or automatic parking-out, a speaker 75 configured to output an alarm or notification information, and a brake control device 60, a steering control device 70, and an engine control unit 80 configured to control a behavior of the vehicle to perform automatic parking-in in a found parking space or automatic parking-out from a parking space under control of the electronic control unit 40.

Furthermore, the driving assistance device may further include an active hydraulic booster (AHB) 90 that is a vehicle regenerative brake, and an around view monitoring system (AVM) 95 configured to acquire a 360-degree image around the vehicle. The AVM 95 includes four cameras respectively installed on front, rear, right, and left sides of the vehicle and functions to assist a driver during parking-in or parking-out by grasping obstacles located on four sides of the vehicle.

In addition, the driving assistance device according to the embodiment of the present invention may include a human-machine interface (HMI) 50 configured to display a parking-in state, a parking-out state, or vehicle condition information on a display device (not illustrated) under control of the electronic control unit 40.

The front sensing unit 10 and the rear sensing unit 20 may be ultrasonic sensors. A distance to an object may be measured by receiving echo ultrasonic signals reflected from the object through the ultrasonic sensors. The electronic control unit 40 receives sensing signals sensed through the front sensing unit 10 and the rear sensing unit 20. Although it has been described that the ultrasonic sensors are used as the front sensing unit 10 and the rear sensing unit 20, a radar may also be used.

The front sensing unit 10 may be installed at each of a center and corners of the front side of the vehicle and may be provided in plurality. Similarly, the rear sensing unit 20 may be installed at each of a center and corners of the rear side of the vehicle and may be provided in plurality.

When there is no movement of the vehicle during automatic parking-in control or automatic parking-out control, the electronic control unit 40 may safely guide parking-in or parking-out of the vehicle by determining that a driving road is a slope road and increasing torque to be applied to the engine control unit 80. The electronic control unit 40 may include a slope road determination unit 41 and a torque determination unit 42.

More specifically, when automatic parking-in or parking-out is requested through the switch 30, the electronic control unit 40 controls automatic parking-in or automatic parking-out by applying preset engine torque (for example, 200 rpm) to the engine control unit 80 while reducing a brake pressure (for example, 100 bar) applied to the AHB 90 to a preset brake pressure (for example, 50 bar). Such automatic parking-in or automatic parking-out control cause the vehicle to move, i.e. a creeping phenomenon occurs.

The slope road determination unit 41 receives a wheel pulse, a brake pressure, and a wheel speed of the vehicle during the automatic parking-in or the automatic parking-out, and determines whether there is a movement of the vehicle, based on the received wheel pulse, the received brake pressure, and the received wheel speed. When there is no movement of the vehicle, the slope road determination unit 41 determines that the driving road of the vehicle is the slope road.

That is, the electronic control unit 40 may determine whether there is the movement of the vehicle by comparing the wheel pulse, the brake pressure, and the wheel speed with a vehicle immovable condition during the automatic parking-in control or the automatic parking-out control. Therefore, since the slope road is determinable only by using engine torque and a brake control amount, it is possible to solve an existing problem that the slope road determination has depended on a longitudinal G sensor, that is, a problem that reliability of slope road determination has been reduced due to occurrence of an excessive signal error according to sensitivity of the longitudinal G sensor at a low speed. Also, it is possible to solve an existing problem that parking-in or parking-out has been impossible due to a minute movement of a vehicle.

The vehicle immovable condition means a condition in which the wheel pulse constantly maintained without change and thus the vehicle wheel speed is zero, although the wheel pulse is received by applying the preset engine torque and the brake pressure is less than or equal to a preset brake pressure (for example, 50 bar), during the automatic parking-in control or the parking-out control. When the vehicle immovable condition is satisfied, it is determined that the driving road of the vehicle is a flatland. When the vehicle immovable condition is not satisfied, it is determined that the driving road of the vehicle is a slope road.

The wheel pulse and the wheel speed are received through a wheel sensor (not illustrated) installed in the vehicle, and the brake pressure is received through the AHB 90 installed in the vehicle. Although it has been described that the wheel pulse and the wheel speed are received through the wheel sensor and the brake pressure is received through the AHB 90, the wheel pulse, the brake pressure, and the wheel speed may also be received through other electronic control units or various sensors installed in the vehicle.

As described above, when it is determined that the driving road of the vehicle is the slope road during the automatic parking-in control or the automatic parking-out control, the torque determination unit 42 may safely assist parking-in and parking-out by calculating control torque for a behavior of the vehicle on the slope road, instead of preset torque suitable for a flatland, and applying the calculated control torque to the engine control unit 80.

The control torque for the behavior of the vehicle on the slope road may be calculated by using Equation 1 below:

$$\text{control torque} = \text{gain} \times (\text{normal torque}) + (1-\text{gain}) \times (\text{wheel travel/wheel tooth})/(\text{vehicle wheel speed}) \quad [\text{Equation 1}]$$

In Equation 1, the normal torque is preset torque and the gain is a predetermined value influencing the torque. First, the torque determination unit 42 cause the vehicle to start to move on the slope road by applying a value of gain×(normal torque) to the engine control unit 80 of the vehicle that is determined as traveling on the slope road by the slope road determination unit 41. Next, the torque determination unit 42 continuously controls the behavior of the vehicle on the slope road by measuring a travel distance of the vehicle and applying a value of (1−gain)×(wheel travel/wheel tooth)/(vehicle wheel speed) to the engine control unit 80. The wheel travel is an actual travel distance calculated through a wheel pulse received from the wheel sensor, the wheel tooth is a travel distance preset according to a degree of slope, and the vehicle wheel speed is a vehicle wheel speed received from the wheel sensor.

In addition, the wheel sensor may measure a travel direction of a wheel according to a magnitude of the wheel pulse. It is preferable to grasp the measured travel direction of the wheel and calculate the control torque for the behavior of the vehicle on the slope road.

A driving assistance method using the driving assistance device as configured above will be described with reference to FIG. 2.

FIG. 2 is a flowchart of a driving assistance method using a driving assistance device, according to another embodiment of the present invention.

The electronic control unit 40 receives a request for automatic parking-in or automatic parking-out through the switch 30 (S11). That is, the electronic control unit 40 receives a selection signal for automatic parking-in or automatic parking-out through the switch 30.

The electronic control unit 40 controls automatic parking-in or automatic parking-out by applying preset torque to the engine control unit 80 while reducing a brake pressure applied to the AHB 90 to a preset brake pressure in response to the selection signal received through the switch 30, i.e., a parking-in selection signal or a parking-out selection signal (S13).

The electronic control unit 40 receives a wheel pulse, a brake pressure, and a wheel speed during the automatic parking-in control or the automatic parking-out control of operation S13 (S15). Operation S15 has only to be performed before operation S17 to be described below.

The electronic control unit 40 determines whether there is a movement of the vehicle, based on the received wheel pulse, the received brake pressure, and the received wheel speed (S17). More specifically, the electronic control unit 40 determines that there is no movement of the vehicle, when the wheel pulse constantly maintained without change and thus the vehicle wheel speed is zero although the wheel pulse is received by applying the preset engine torque and the brake pressure is less than or equal to a preset brake pressure, during the automatic parking-in control or the parking-out control.

When it is determined in operation S17 that there is the movement of the vehicle, the electronic control unit 40 determines that a driving road of the vehicle is a flatland (S20). Then, the electronic control unit 40 returns the process to operation S13 to perform parking-in control or parking-out control at the preset torque.

When it is determined in operation S17 that there is no movement of the vehicle, the electronic control unit 40 determines that the driving road of the vehicle is a slope road (S19). It is possible to determine whether the driving road of the vehicle is the slope road, based on the wheel pulse, the brake pressure, the wheel speed, and a vehicle immovable condition, thereby reducing occurrence of a signal error according to sensitivity of a slope road determination sensor, e.g., a longitudinal G sensor, at a low speed.

Then, the electronic control unit 40 calculates control torque required for a behavior of the vehicle on the slope road by using Equation 1 above, such that the preset torque is increased (S21). The calculated control torque is greater than the preset torque.

The electronic control unit 40 performs parking-in control or parking-out control by applying the calculated control torque to the engine control unit 80 (S23).

As described above, by applying the control torque required for the behavior of the vehicle on the slope road, instead of the torque suitable for the flatland, it is possible to solve an existing problem that parking-in or parking-out on the slope road has been impossible due to the application of the torque suitable for the flatland. Also, it is possible to prevent a vehicle collision caused by vehicle sliding or the like due to the application of the torque suitable for the flatland during the parking-in or parking-out on the slope road. Consequently, accurate parking-in or parking-out may be safely guided.

According to the embodiments of the present invention, it is possible to guide safe parking-in or parking-out by increasing engine torque and applying the increased engine torque to the engine control unit when there is no movement of the vehicle during automatic parking-in control or automatic parking-out control of the vehicle at preset engine torque and brake pressure. Also, it is possible to prevent a vehicle collision caused by vehicle sliding or the like on the slope road.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

10: front sensing unit
30: switch

41: slope road determination unit
50: HMI
70: steering control device
80: engine control unit
95: AVM
20: rear sensing unit
40: electronic control unit
42: torque determination unit
60: brake control device
75: speaker
90: AHB

What is claimed is:

1. A driving assistance device for assisting parking-in or parking-out of a vehicle, the driving assistance device comprising:
an electronic control unit configured to determine whether a driving road of the vehicle is a slope road, based on a wheel pulse, a brake pressure, and a wheel speed of the vehicle, during parking-in control or parking-out control of the vehicle, and to increase torque to be applied to the engine control unit when the driving road of the vehicle is the slope road.

2. The driving assistance device according to claim 1, wherein the electronic control unit determines that the driving road is the slope road, when the wheel speed is zero although the wheel pulse is received and the brake pressure is less than or equal to the preset brake pressure during the automatic parking-in control or the automatic parking-out control of the vehicle by applying the preset torque to the engine control unit while reducing the brake pressure to a preset brake pressure.

3. The driving assistance device according to claim 2, wherein the electronic control unit enables a movement of the vehicle on the slope road by applying a value of gain×(the preset torque) to the engine control unit of the vehicle that is determined as traveling on the slope road, where the gain is a predetermined set value influencing the torque.

4. The driving assistance device according to claim 3, wherein the electronic control unit continuously controls a behavior of the vehicle on the slope road by measuring a wheel travel of the vehicle and applying torque based on (wheel travel/wheel tooth) to the engine control unit, where the wheel travel is an actual travel distance calculated through a wheel pulse of the vehicle and the wheel tooth is a travel distance preset according to a degree of slope.

5. A driving assistance method using a driving assistance device for assisting parking-in or parking-out of a vehicle, the driving assistance method comprising:
receiving a wheel pulse, a brake pressure, and a wheel speed of the vehicle during parking-in control or parking-out control of the vehicle;
determining whether a driving road of the vehicle is a slope road, based on the received wheel pulse, the received brake pressure, and the received wheel speed; and
performing the parking-in control or the parking-out control of the vehicle by increasing torque applied to an engine control unit when the driving road of the vehicle is the slope road.

6. The driving assistance method according to claim 5, wherein the determining of whether the driving road of the vehicle is the slope road comprises determining that the driving road is the slope road, when the wheel speed is zero although the wheel pulse is received and the brake pressure is less than or equal to the preset brake pressure during the automatic parking-in control or the automatic parking-out control of the vehicle by applying the preset torque to the engine control unit while reducing the brake pressure to a preset brake pressure.

7. The driving assistance method according to claim 6, wherein the performing of the parking-in control or the parking-out control of the vehicle comprises applying a value of gain×(the preset torque) to the engine control unit, where the gain is a predetermined set value influencing the torque.

8. The driving assistance method according to claim 7, wherein the performing of the parking-in control or the parking-out control of the vehicle comprises measuring a wheel travel of the vehicle and applying torque based on (wheel travel/wheel tooth) to the engine control unit of the vehicle, where the wheel travel is an actual travel distance calculated through the wheel pulse of the vehicle and the wheel tooth is a travel distance preset according to a degree of slope.

* * * * *